United States Patent [19]

Moser

[11] 4,111,108

[45] Sep. 5, 1978

[54] PERCOLATOR

[76] Inventor: Louis Moser, 10, Le Seut, 2735 Malleray, Switzerland

[21] Appl. No.: 786,399

[22] Filed: Apr. 11, 1977

[30] Foreign Application Priority Data

| Apr. 13, 1976 | [CH] | Switzerland | 4657/76 |
| Mar. 17, 1977 | [CH] | Switzerland | 3322/77 |
| Mar. 17, 1977 | [CH] | Switzerland | 3323/77 |

[51] Int. Cl.² .............................................. A47J 31/30
[52] U.S. Cl. ................................. 99/289 R; 99/302 P
[58] Field of Search .................. 99/289 R, 290, 287, 99/297, 302 P, 295

[56] References Cited

U.S. PATENT DOCUMENTS

| 2,993,430 | 7/1961 | Maxwell | 99/289 |
| 3,064,553 | 11/1962 | Simjian | 99/289 |
| 3,089,404 | 5/1963 | Parraga | 99/289 |
| 3,408,921 | 11/1968 | Freese | 99/295 |
| 3,760,712 | 9/1973 | Rossi | 99/289 |

Primary Examiner—Edward J. McCarthy
Attorney, Agent, or Firm—Robert E. Burns; Emmanuel J. Lobato; Bruce L. Adams

[57] ABSTRACT

This percolator is directed to preserve the flavor and aroma of coffee and comprises for this purpose a filter engaging piston and another piston for compressing and discharging the coffee grounds, both pistons being disposed on a same horizontal axis in mutual registration in a common cylinder and driven independently of each other by separate hydraulic pistons.

8 Claims, 9 Drawing Figures

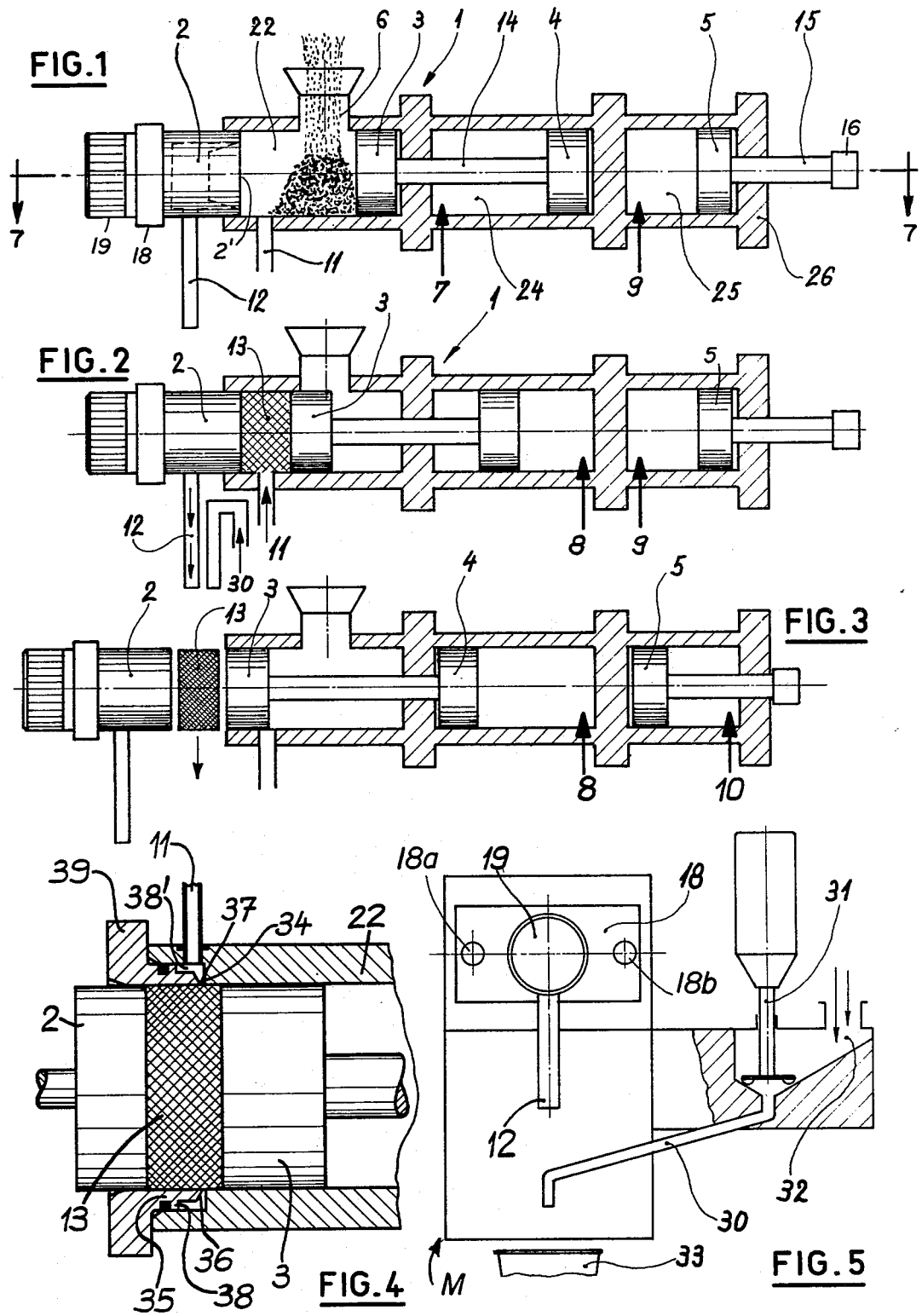

PERCOLATOR

BACKGROUND OF THE INVENTION

1. Field of the Invention

This invention relates to percolators, notably for making coffee, of the type comprising essentially a hot water reservoir associated with a pump for pressurizing the water and a pressure-water circuit for controlling the various phases of the coffee preparation.

2. Description of the Prior Art

In known percolators the various operations constituting a coffee preparation cycle, namely introducing the ground coffee, compressing the ground coffee, injecting hot water for filtration, and eventually discharging the coffee grounds, take place vertically with the assistance of a positioning revolving tray. The mechanism of these known machines is complicated, liable to serious disturbances and difficult to maintain. On the other hand the water injected through the compressed coffee is not distributed uniformly, so that since some portions of the coffee cake are washed excessively by the stream of hot water a bitter taste is obtained, and in addition during the filtration a fresh dose of coffee is already compressed and left waiting in the warm machine. If this waiting period is too long the coffee dose becomes unusable and must be discarded. In addition to the loss of product the coffee taste and aroma are spoiled.

SUMMARY OF THE INVENTION

The percolator according to the present invention obviates the various inconveniences mentioned hereinabove by providing means consisting essentially of a filter-pressing piston and a coffee-grounds compressing and discharging piston, both pistons being disposed on a common horizontal axis and registering with each other in a common cylinder, separate hydraulically-operated pistons being provided for actuating said pistons.

IN THE DRAWINGS

FIG. 1 illustrates diagrammatically in longitudinal axial section a typical form of embodiment of the percolator of this invention in an initial position;

FIG. 2 is a view similar to FIG. 1 showing a second position or coffee filtration phase;

FIG. 3 shows a third position for of the pistons during the discharge of coffee-grounds;

FIG. 4 illustrates the position of the coffee-grounds compression piston associated with the water injection means;

FIGS. 5 and 6 are a side elevational and a front view, respectively, of the percolator;

FIG. 7 is a sectional view taken along lines 7—7 in FIG. 1; while

DESCRIPTION OF THE PREFERRED EMBODIMENTS

Figure 7:
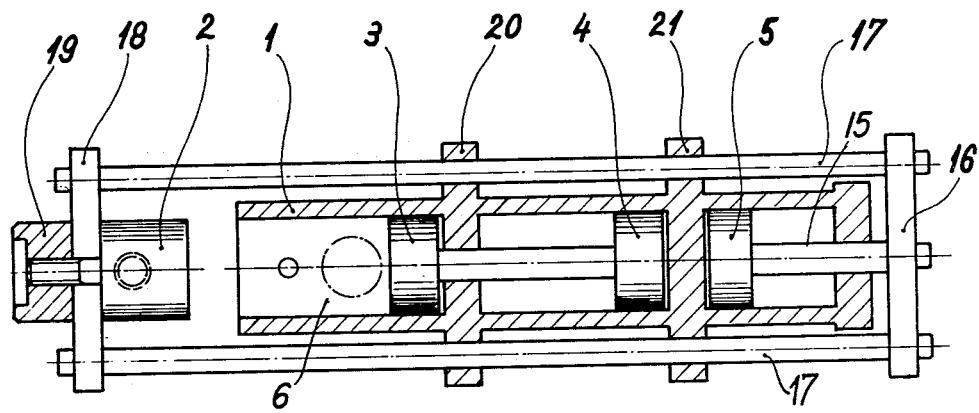
Figure 8:
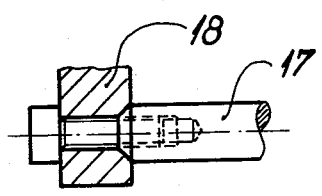
FIG. 8 is a detail therefrom.

FIG. 1 illustrates in diagrammatic or simplified longitudinal axial view and piston supporting structure 1 with the pistons and cylinder in their initial positions. A common cylinder 22 for two pistons 2 and 3 has a radial aperture 6 formed therein for introducing the ground coffee. An open end of this cylinder (FIG. 3), in this position (FIG. 1) is closed by a piston 2 that is hollow, supports the filter (schematically shown at 2'), and comprises a pipe 12 for delivering the percolated coffee. In its endmost position (FIG. 3) this piston 2 frees the bottom of cylinder 22 to permit the discharge of the coffee-grounds therefrom. This piston 2 is secured by means of a knurled nut 19 to a flange 18 secured in turn, as shown in FIGS. 7 and 8, to a pair of longitudinal side rods 17. These rods 17 are guided in sliding bearings 20, 21 and rigid with the driving or control piston 5 via the piston rod 15 and another flange 16 opposite said flange 17. Reverting to FIG. 1, it will be seen that the same cylinder 22 receives, axially spaced from and registering with the filter supporting piston 2, another piston 3 for compressing the coffee-grounds between the two cylinders and for ultimately discharging them by the second and compressing piston, as will be described, this last-mentioned piston 3 being coupled to another driving or control piston 4 via a central rod 14.

The function of pipe 11 is to inject hot water through the ground coffee. Of course, adequate pipings are provided for supplying water under pressure to the driving or control cylinders 24 and 25; to simplify the drawing, these pipings are not shown but simply designated by arrows 7, 8, 9 and 10, further mentioned in the part entitled "Operation" of the present specification.

Means of any known and suitable type and not shown are provided for obtaining a heat insulation between, cylinder 22 and control cylinders 24 and 25, axially aligned therewith and containing the control pistons 4, 5, as shown.

FIG. 4 illustrates in longitudinal section the front portion of the common cylinder 22 and shows details thereof, but is simplified as to piston 2.

Between the grounds compression piston 3 and the filter supporting and pressing piston 2 the cylinder 22 has formed in its bore a shoulder 34 and comprises a liner 35 of which the inner edge 36 is bevelled. This liner 35 comprises a flange-like base 39 for accurately positioning same by engaging the front end of cylinder 22 so as to form a circular slot 37 between said bevelled edge of liner 35 and the cylinder shoulder 34. The end of this liner 35 comprises a shoulder 38 forming a circular groove 38' registering with the aforesaid circular slot 37. Disposed across this circular groove 38' is a union 11 for supplying boiling water to cylinder 22 between pistons 2 and 3, as shown.

Due to the delivery of injected hot water through a narrow slot, this water is distributed along the entire periphery through the ground coffee.

FIG. 5 is a simplified view of the percolator according to this invention and shows more particularly a mixer 31 for preparing a dose of milk and sugar, and possibly an additional amount of hot water metered at 32, this additional water flowing into the underlying cup 33 via a pipe 30.

Figure 6:
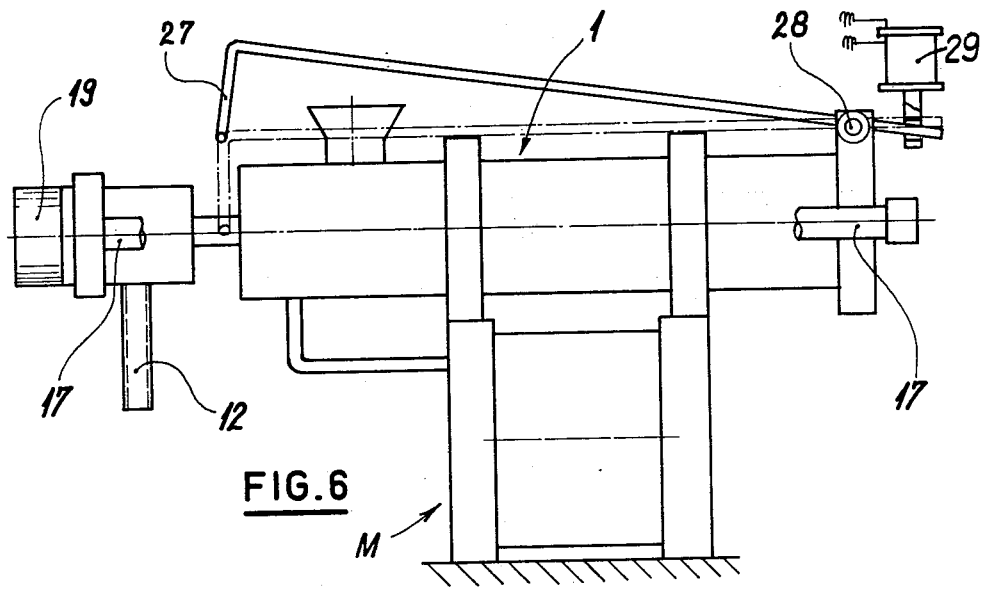

FIG. 6 illustrates more particularly the arrangement of a hammer 27 for striking the coffee grounds cake 13 (FIG. 3) and thus cause the latter to fall. This hammer is fulcrumed at 28 and actuated by an electromagnet 29.

The automatic means M controlling the coffee preparation cycle are not specifically described herein since they comprise elements well known in the technical field concerned, including a timer associated with a hydraulic distributor, solenoid valves, electromagnets, as well as conventional measuring, metering and safety devices.

However, it may be pointed out that the percolator according to this invention is characterized mainly in that it is easy to maintain and disassemble, and that the operator can easily remove the filter from piston 2 for cleaning or replacing same. The coffee thus obtained has unrivalled taste and aroma, since coffee-beans ground for each separate cup are utilized, the injected water being distributed uniformly through the compressed ground coffee and the coffee is filtered within a relatively short time.

OPERATION

The percolator according to the instant invention operates as follows: Initially, as shown in FIG. 1, all the pistons are in their endmost position to the right, as seen in this Figure, due to the pressure of the water introduced at 7 and 9.

The desired type of coffee is preselected by means of push-buttons 18a, 18b, to be with or without cream, and with or without sugar. The coffee-mill (not shown) is started, grinding one dose of coffee-beans, and the ground coffee falls at 6 into cylinder 22. Then (FIG. 2), water under pressure flowing continuously through the inlet 9 actuates drive piston 5 and side rods 17 to keep the filter piston 2, while the drive piston 4 pushed by water supplied at 8 drives the compression piston 3 causing the ground coffee 13 in cylinder 22 to be pressed against the filter on hollow piston 2. That piston is retained in its operative position by the opposite drive piston 5 exerting a pressure greater than that exerted by pistons 4 and 3 through grounds 13.

A metered volume of water under pressure is injected via pipe 11 into the cake of ground coffee 13, and the filtered coffee flows from pipe 12 into the underlying cup 33. If a large cup is used, a mixer 31 releases an additional dose of hot water metered at 32 and supplied if desired in conjunction with a dose of milk and sugar via tube 30 into cup 33 (FIG. 5).

When the filtration phase is completed (FIG. 3) water under pressure supplied at 10 causes pistons 5 and 2 to recede to the left, as seen in the drawing, and piston 3, continuing to be driven by piston 4, discharges the coffee-grounds 13. A striker 27 consisting either of a hammer responsive to an electromagnet 29, as illustrated in FIG. 6, or of a rod carrying an eccentric member responsive to an electric motor, strikes the cake of coffee grounds to detach and cause them to drop into a receptacle provided for this purpose (not shown).

The supply of control water is then switched from and the percolator is ready for performing another cycle (FIG. 1).

Figure 9:
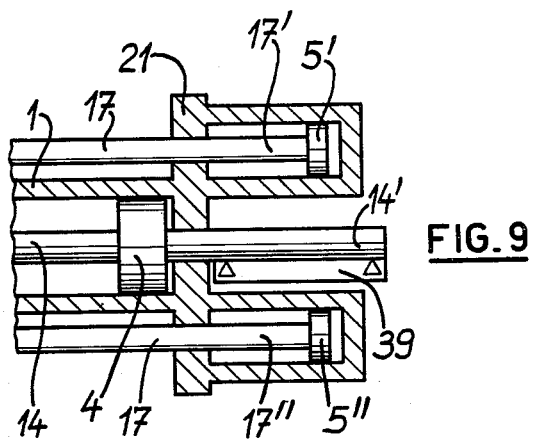
FIG. 9 is a fragmentary view of a modification of FIG. 7.

In order to improve the safety of operation of the above-described percolator, the filter-engaging piston 2 may be driven by a air of drive pistons 5', 5" disposed in parallel on either side of the percolator, as illustrated in FIG. 9, one drive piston for each side or control rod 17' and 17". The rods extend parallel to and externally of, the main or common cylinder and piston structure 1, as before; the central rod 14 of the coffee-grounds driving pistons can be provided with an extension 14' at the rear of the percolator where it is connected to a stroke limiting device 39.

This modified form of embodiment is illustrated in FIG. 9 showing a fragmentary and simplified horizontal axial section of the structure 1 comprising the cylinders and pistons in their initial position.

It is not deemed necessary to describe in detail this stroke limiting device which may advantageously comprise for example conventional limit switches controlling solenoid valves. Of course, the control cylinders 24 and 25 are provided with unions and pipings for the control water, however, to simplify the drawing, these unions and pipings are omitted therefrom.

Although specific forms of embodiments of this invention have been described hereinabove and illustrated in the accompanying drawings, it will readily occur to those skilled in the art that various modifications and changes may be brought thereto without departing from the scope of the invention as set forth in the appended claims.

What is claimed is:

1. A percolator, comprising;

a unitary cylinder, having, axially aligned and mutually spaced, a pair of coffee compressing pistons normally positioned in the cylinder to jointly define a chamber for coffee grounds, the pair comprising a filter piston which has and supports a coffee filter, and a grounds discharging piston for ultimately discharging the coffee grounds from the chamber;

hydraulic drive pistons disposed in the unitary cylinder, one for each coffee compressing piston, for driving those pistons separately to vary their spacing and position so as to first receive loose coffee grounds therebetween and thereafter to compress them; and means defining an open end of the cylinder adjacent the filter piston and for entirely removing that piston and the compressed coffee grounds from the cylinder.

2. A percolator according to claim 1, in which the filter piston is hollow and has a pipe for delivering filtered coffee therefrom.

3. Percolator according to claim 1, in which the drive pistons include a pair of pistons disposed parallel to one another externally of a portion of the cylinder remote from the open end thereof, for driving the filter piston; the grounds discharging piston having a central rod connecting it with its drive piston, an extension of the central rod centrally of said portion of the cylinder, and a device coupled to the extension for limiting strokes thereof and of the grounds discharging piston, the device being located externally of the cylinder.

4. A percolator according to claim 1, including a striker for striking the coffee grounds removed from the cylinder to detach them from the coffee compressing pistons.

5. A percolator according to claim 1, including timer means for presetting (a) a delivery of ground coffee into the chamber, (b) a control of strokes of the drive pistons to drive the coffee compressing pistons for first compressing the coffee grounds in the chamber against the filter and for thereafter discharging the coffee grounds from the chamber, and (c) a removal of the coffee grounds from the coffee compressing pistons after their removal from the chamber.

6. A percolator, comprising:

a cylinder, having, axially aligned and mutually spaced, a pair of coffee compressing pistons normally positioned in the cylinder to jointly define a chamber for coffee grounds, the pair comprising a filter piston which has and supports a coffee filter, and a grounds discharging piston for ultimately discharging the coffee grounds from the chamber, hydraulic drive pistons disposed in the cylinder, one for each coffee compressing piston, for driving those pistons separately to vary their spacing and position so as to first receive loose coffee grounds therebetween and thereafter to compress them, the drive piston for the filter piston being disposed in a portion of the cylinder remote from the latter, and having side rods extending externally of the cylinder to couple that drive piston with the filter piston and means defining an open end of the cylinder adjacent the filter piston, permitting the side rods to entirely remove that piston and the compressed coffee grounds from the cylinder.

7. A percolator according to claim 6, in which the cylinder has a lateral aperture between end portions thereof for introducing the loose coffee grounds into the chamber.

8. A percolator according to claim 6, including in the cylinder at the open end thereof, a liner having a bevelled inner edge and positioned to define a circular slot between the edge and the cylinder, and, around the liner, means in the cylinder defining a circular groove for receiving boiling water for uniform distribution thereof through the slot into the coffee grounds in the chamber, the liner also having a base portion for positioning the liner in the cylinder with a surface of the liner bearing against a portion of the cylinder at the open end thereof.

* * * * *